US010746075B2

United States Patent
Han et al.

(10) Patent No.: US 10,746,075 B2
(45) Date of Patent: Aug. 18, 2020

(54) THERMOELECTRIC MODULE FOR USE IN A VEHICLE SYSTEM

(71) Applicant: GM GLOBAL TECHNOLOGY OPERATIONS LLC, Detroit, MI (US)

(72) Inventors: Su Jung Han, West Bloomfield, MI (US); Sharon Xiaobin Li, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 4 days.

(21) Appl. No.: 16/033,901

(22) Filed: Jul. 12, 2018

(65) Prior Publication Data

US 2020/0018214 A1    Jan. 16, 2020

(51) Int. Cl.
| | |
|---|---|
| F01N 3/20 | (2006.01) |
| F01N 5/02 | (2006.01) |
| F01N 9/00 | (2006.01) |
| F01N 11/00 | (2006.01) |

(52) U.S. Cl.
CPC ............ *F01N 9/00* (2013.01); *F01N 3/2026* (2013.01); *F01N 3/2046* (2013.01); *F01N 5/025* (2013.01); *F01N 11/002* (2013.01); *F01N 2390/02* (2013.01); *F01N 2900/1602* (2013.01)

(58) Field of Classification Search
CPC ........ F01N 2240/02; F01N 5/02; F01N 5/025; F01N 11/002; F01N 2390/02; F01N 2900/1602; F01N 3/2026; F01N 3/2046; F01N 9/00

See application file for complete search history.

(56) References Cited

U.S. PATENT DOCUMENTS

| | | | | |
|---|---|---|---|---|
| 6,096,966 A | * | 8/2000 | Nishimoto | .............. H01L 35/32 136/203 |
| 6,986,247 B1 | | 1/2006 | Parise | |
| 7,051,522 B2 | | 5/2006 | Yang et al. | |
| 7,523,607 B2 | * | 4/2009 | Sullivan | .................... F01N 3/18 60/320 |
| 9,761,781 B2 | | 9/2017 | Sui et al. | |
| 2003/0223919 A1 | * | 12/2003 | Kwak | ................ B01D 53/9445 422/174 |

(Continued)

*Primary Examiner* — Hung Q Nguyen
*Assistant Examiner* — Diem T Tran
(74) *Attorney, Agent, or Firm* — Quinn IP Law

(57) ABSTRACT

A vehicle system includes a vehicle component, a battery, and a thermoelectric module coupled to the component to allow heat transfer between the catalytic converter and the thermoelectric module, wherein the thermoelectric module is electrically connected to the battery. The vehicle system further includes a temperature sensor coupled to the vehicle component. The temperature sensor is configured to measure the temperature of the vehicle component. The vehicle system further includes a controller in electronic communication with the thermoelectric module. The controller is programmed to switch the thermoelectric module among the heating mode, the cooling mode, and the power-generation mode based on the temperature of the vehicle component. The vehicle component may be an exhaust manifold, a turbocharger turbine housing, an exhaust gas conduit coupled between an exhaust manifold and a catalytic converter, and/or a catalytic converter.

15 Claims, 3 Drawing Sheets

(56) References Cited

U.S. PATENT DOCUMENTS

2011/0067742 A1\* 3/2011 Bell .................... F01N 3/043
136/204
2011/0258995 A1\* 10/2011 Limbeck ................ H01L 35/30
60/320

\* cited by examiner

THERMOELECTRIC MODULE FOR USE IN A VEHICLE SYSTEM

INTRODUCTION

The present disclosure relates to a thermoelectric module for use in a vehicle system.

Vehicles include vehicle components, such as catalytic converters, that may need heating or cooling. For example, it may be desirable to heat or cool a catalytic converter to optimize its efficiency. Further, vehicle components (e.g., catalytic converters) may generate excess heat that may be used for other purposes.

SUMMARY

It is therefore desirable to develop a system for heating and cooling vehicle components. It is also desirable to convert the excess heat from a vehicle component into electrical energy.

The present disclosure describes a thermoelectric module that provides optimized temperature of the catalytic converter (or other vehicle component) by using Peltier heater/cooler functions. This thermoelectric module could also be used as a thermoelectric self-power generator utilizing the engine waste heat when the heating and cooling functions are not needed. The present disclosure also describes a method for controlling the thermoelectric module. By executing this method, the vehicle emissions are minimized by enhancing catalyst light-off and reducing cold start soot creation. Further, by utilizing this method, the electric power generation is possible using waste heat from the after-treatment system. Also, by utilizing this method, the fuel economy of the vehicle system is enhanced by reducing the need for enrichment.

To minimize vehicle emissions, faster control of catalytic converter temperature is desirable. During a cold start, catalytic converter light-off should occur within 15-20 seconds, especially for gasoline engines. During hot engine running, cooling of the exhaust manifold and catalytic converter are desirable to protect the components and meet the engine power demand. The presently disclosed vehicle system combines both thermoelectric heating and cooling, in addition to power generation into one thermoelectric module. The thermoelectric module is directly mounted on the outer surface of the catalytic converter and exhaust vehicle components to heat the catalyst during cold starts, while cooling the catalyst and/or exhaust vehicle components during overheating. P-type and n-type materials will be alternately deposited and connected to a rechargeable battery. A controller (with the assistance of temperature sensors) decides the direction of electrical current applied to either heat or cool exhaust components to maintain the desired temperatures and maintain the optimized catalytic efficiency. When the exhaust temperature is within the desired range, this thermoelectric module may be converted into a thermoelectric power generator to create electricity via thermal gradient from catalytic converter/exhaust to outer surface of the vehicle component, thus harvesting electrical energy through the exhaust waste heat.

In certain embodiments, an after-treatment system includes a catalytic converter and a thermoelectric module coupled to the catalytic converter to allow heat transfer between the catalytic converter and the thermoelectric module. The thermoelectric module has: (a) a heating mode in which the thermoelectric module heats the catalytic converter; (b) a cooling mode in which the thermoelectric module cools the catalytic converter; (c) a power-generation mode in which the thermoelectric module converts a temperature gradient of the catalytic converter directly into electrical energy. The after-treatment system further includes a temperature sensor coupled to the catalytic converter. The temperature sensor is configured to measure a temperature of the catalytic converter. The temperature sensor is configured to generate a signal indicative of the temperature of the catalytic converter. The after-treatment system further includes a controller in electronic communication with the thermoelectric module, wherein the controller is programmed to: determine the temperature of the catalytic converter based on the signal received from the temperature sensor and switch the thermoelectric module among the heating mode, the cooling mode, and the power-generation mode based on the temperature of the catalytic converter. The controller is further programmed to determine that the temperature of the catalytic converter is less than a light-off temperature of the catalytic converter and, in response to determining that the temperature of the catalytic converter is less than a light-off temperature of the catalytic converter, switch the thermoelectric module to operate in the heating mode to heat the catalytic converter.

The controller is further programmed to: determine that the temperature of the catalytic converter is less than a predetermined maximum temperature in response to determining that the temperature of the catalytic converter is less than a predetermined maximum temperature, switch the thermoelectric module to operate in the power-generation mode to generate the electrical energy directly from a temperature gradient of the catalytic converter. The controller is further programmed to switch the thermoelectric module to operate in the power-generation mode to generate the electrical energy directly from the temperature gradient of the catalytic converter in response to determining that the temperature of the catalytic converter is less than the predetermined maximum temperature and determining that the temperature of the catalytic converter is greater than the light-off temperature of the catalytic converter. The controller is further programmed to: in response to determining that the temperature of the catalytic converter is greater than the predetermined maximum temperature, switch the thermoelectric module to operate in the cooling mode to cool the catalytic converter. The controller is programmed to: switch the thermoelectric module to operate in the cooling mode to cool the catalytic converter in response to determining that the temperature of the catalytic converter is greater than the predetermined maximum temperature and determining that the temperature of the catalytic converter is greater than the light-off temperature of the catalytic converter. The thermoelectric module is in direct contact with the catalytic converter. The thermoelectric module is electrically coupled to a battery.

The present disclosure also describes a method for operating a vehicle system. The method includes determining a temperature of a catalytic converter and heating the catalytic converter using a thermoelectric module in response to determining that the temperature of the catalytic converter is less than a light-off temperature of the catalytic converter. Further, the method includes supplying electrical energy to a battery using the thermoelectric module in response to determining that the temperature of the catalytic converter is less than the predetermined maximum temperature. Supplying the electrical energy to the battery using the thermoelectric module occurs in response to determining that the temperature of the catalytic converter is less than the predetermined maximum temperature and determining that the temperature of the catalytic converter is greater than the light-off temperature of the catalytic converter. The method further includes cooling the catalytic converter using the thermoelectric module in response to determining that the temperature of the catalytic converter is greater than a predetermined maximum temperature. Cooling the catalytic converter using the thermoelectric module occurs in response to determining that the temperature of the catalytic converter is greater than the predetermined maximum temperature and determining that the temperature of the catalytic converter is greater than the light-off temperature of the catalytic converter.

The present disclosure also describes a vehicle system. The vehicle system includes a vehicle component, a battery, and a thermoelectric module coupled to the component to allow heat transfer between the catalytic converter and the thermoelectric module, wherein the thermoelectric module is electrically connected to the battery. The thermoelectric module is configured to operate as described above. The vehicle system further includes a temperature sensor coupled to the vehicle component. The temperature sensor is configured to measure the temperature of the vehicle component. The vehicle system further includes a controller in electronic communication with the thermoelectric module. The controller is programmed to switch the thermoelectric module among the heating mode, the cooling mode, and the power-generation mode based on the temperature of the vehicle component. The vehicle component may be an exhaust manifold, a turbocharger turbine housing, an exhaust gas conduit coupled between an exhaust manifold and a catalytic converter, and/or a catalytic converter.

The above features and advantages and other features and advantages of the present disclosure are readily apparent from the following detailed description of the best modes for carrying out the disclosure when taken in connection with the accompanying drawings.

DETAILED DESCRIPTION

Figure 1:
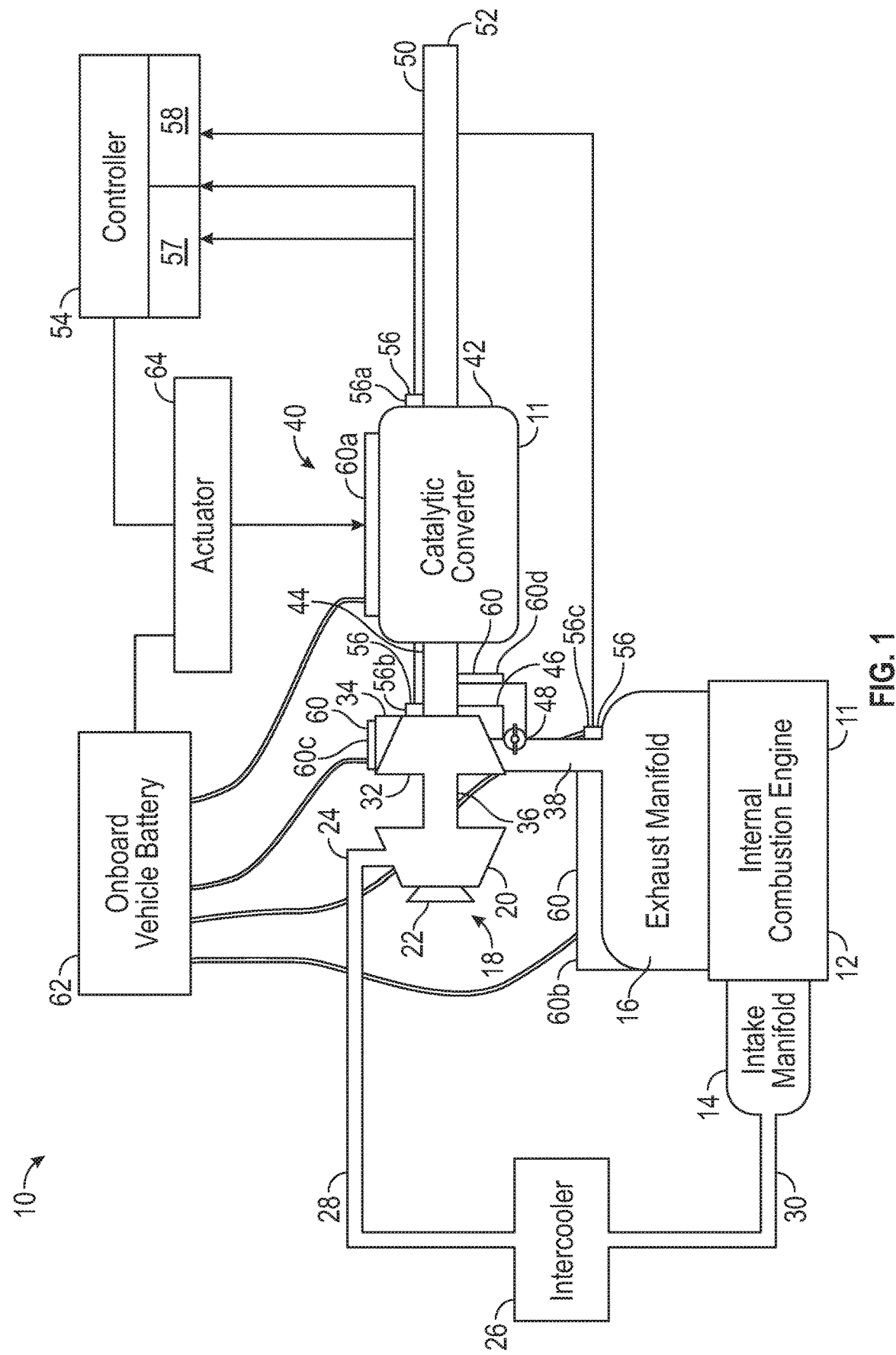
FIG. 1 is a schematic illustration of a vehicle system including an after-treatment system with a thermoelectric module.

With reference to FIG. 1, a vehicle system 10 includes a plurality of vehicle components 11, such an internal combustion engine 12 for propulsion. The internal combustion engine 12 is configured to combust an air-fuel mixture to propel the vehicle system 10. The vehicle system 10 may be a car, a truck, agricultural equipment, or other suitable system capable of transporting objects and/or passengers. The vehicle system 10 further includes an intake manifold 14 in fluid communication with the internal combustion engine 12. The intake manifold 14 is configured to receive intake gases and direct the intake gases to the internal combustion engine 12. The vehicle system 10 further includes an exhaust manifold 16 (i.e., one of the vehicle components 11) in fluid communication with the internal combustion engine 12. After combustion, the internal combustion engine 12 generates exhaust gases, and the exhaust gases flow from the internal combustion engine 12 to the exhaust manifold 16.

The vehicle system 10 further includes a turbocharger 18 configured to maximize the efficiency and power output of the internal combustion engine 12 by forcing pressured air into the internal combustion engine 12 through the intake manifold 14. The turbocharger 18 includes a compressor 20 having a compressor inlet 22 configured to receive intake gases. The compressor 20 also has a compressor outlet 24 in fluid communication with the intake manifold 14. The compressor 20 is configured to pressurize the intake gases received through the compressor inlet 22. Then, the pressurized intake gases exit the compressor 20 through the compressor outlet 24. The compressor outlet 24 is in fluid communication with an intercooler 26 through a first intake conduit 28. The intercooler 26 is a heat exchanger that removes waste heat in the pressurized intake gases exiting from the compressor 20. A second intake conduit 30 fluidly couples the intercooler 26 to the intake manifold 14. As such, the intake gases flow from the intercooler 26 to the intake manifold 14. In some embodiments, the vehicle system 10 does not include the turbocharger 18.

The turbocharger 18 further includes a turbine 32 (i.e., one of the vehicle components 11) including a turbocharger turbine housing 34. The turbine 32 is configured to generate power as gases flowing through it. A shaft 36 interconnects the compressor 20 and the turbine 32. As a result, rotation of the turbine 32 causes the compressor 20 to rotate. The exhaust manifold 16 is in fluid communication with the turbine 32 through a first exhaust conduit 38 (i.e., one of the vehicle components 11). As such, the exhaust gases flow from the exhaust manifold 16 to the turbine 32, causing the turbine wheel (not shown) of the turbine 32 to rotate. This rotation of the turbine wheel of the turbine 32 causes the shaft 36 to rotate. In turn, the rotation of the shaft 36 causes the compressor wheel (not shown) of the compressor 20 to rotate.

The vehicle system 10 further includes an after-treatment system 40 including a catalytic converter 42 (i.e., one of the vehicle components 11) configured to treat unturned hydrocarbons, carbon monoxide and various nitrogen oxides procured from the combustion of the internal combustion engine 12. The after-treatment system includes a second exhaust conduit 44 (i.e., one of the vehicle components 11) fluidly interconnecting the turbine 32 and the catalytic converter 42. As such, exhaust gases flow from the turbine 32 to the catalytic converter 42. A bypass conduit 46 (i.e., one of the vehicle components 11) is fluidly coupled between the exhaust manifold 16 and the catalytic converter 42 to bypass the turbine 32. In the depicted embodiment, the bypass conduit 46 is directly connected to the first exhaust conduit 38 and the second exhaust conduit 44 to bypass the turbine 32. A wastegate valve 48 is coupled between the bypass conduit 46 and the first exhaust conduit 38. Consequently, the wastegate valve 48 has a first valve position and a second valve position. In the first valve position, the wastegate valve 48 directs exhaust gases from the exhaust manifold 16 directly into the turbine 32. In the second valve position, the wastegate valve 48 directs exhaust gases directly from the exhaust manifold 16 to the second exhaust conduit 44, thereby bypassing the turbine 32.

The after-treatment system 40 further includes a main exhaust flow conduit 50 in fluid communication with the catalytic converter 42. Accordingly, the exhaust gases flow from the catalytic converter 42 to the main exhaust flow conduit 50. The main exhaust flow conduit 50 has an exhaust gas discharge end 52 to allow the exhaust gases to exit the after-treatment system 40.

The vehicle system 10 further includes a controller 54. The terms "controller," "control module," "control," "control unit," "processor" and similar terms mean one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean controller executable instruction sets including calibrations and look-up tables. The controller 54 may alternatively be configured as a central processing unit (CPU). The controller 54 may include a processor 57 (e.g., a microprocessor) and at least one memory 58, at least some of which is tangible and non-transitory. The memory 58 is configured to store controller executable instruction sets, and the processor can execute the controller executable instruction sets stored in the memory. The memory 58 may be a recordable medium that participates in providing computer-readable data or process instructions. Such a medium may take many forms, including but not limited to non-volatile media and volatile media. Non-volatile media for the controller 54 may include, for example, optical or magnetic disks and other persistent memory. Volatile media may include, for example, dynamic random-access memory (DRAM), which may constitute a main memory. Such instructions may be transmitted by one or more transmission medium, including coaxial cables, copper wire and fiber optics, including the wires that comprise a system bus coupled to the processor. The memory of the controller 54 may also include a floppy disk, a flexible disk, hard disk, magnetic tape, other magnetic medium, a CD-ROM, DVD, other optical medium, etc. The controller 54 may be configured or equipped with other required computer hardware, such as a high-speed clock, requisite Analog-to-Digital (A/D) and/or Digital-to-Analog (D/A) circuitry, a necessary input/output circuitry and devices (I/O), as well as appropriate signal conditioning and/or buffer circuitry. Algorithms required by the controller 54 or accessible thereby may be stored in the memory 58 and automatically executed. The controller 54 may include an electrical current converter.

The vehicle system 10 further includes one or more temperature sensors 56 each configured to measure the temperature of one or more vehicle components 11. Each of the temperature sensor 56 is in electronic communication with the controller 54 and is configured to generate a signal indicative of the temperature of the vehicle component 11. For instance, the vehicle system 10 includes a first temperature sensor 56a coupled to the catalytic converter 42. As such, the first temperature sensor 56a is configured to measure the temperature of the catalytic converter 42 and generate a signal indicative of the temperature of the catalytic converter 42. Because the first temperature sensor 56a is in electronic communication with the controller 54, the first temperature sensor 56a is configured to send this signal to the controller 54. The controller 54 is therefore programmed to receive the signal from the first temperature sensor 56a and determine the temperature of the catalytic converter 42 based on the signal received from the first temperature sensor 54a.

The vehicle system 10 further includes a second temperature sensor 56b coupled to the turbocharger turbine housing 34. As such, the second temperature sensor 56b is configured to measure the temperature of the turbine 32 and generate a signal indicative of the temperature of the turbine 32. Because the second temperature sensor 56b is in electronic communication with the controller 54, the second temperature sensor 56b is configured to send this signal to the controller 54. The controller 54 is therefore programmed to receive the signal from the second temperature sensor 56b and determine the temperature of the turbine 32 based on the signal received from the second temperature sensor 56b.

The vehicle system 10 further includes a third temperature sensor 56c coupled to the exhaust manifold 16, the first exhaust conduit 38, and/or the bypass conduit 46. As such, the third temperature sensor 56c is configured to measure the temperature of the exhaust manifold 16, the first exhaust conduit 38, and/or the bypass conduit 46 and generate a signal indicative of the temperature of the exhaust manifold 16, the first exhaust conduit 38, and/or the bypass conduit 46. Because the third temperature sensor 56c is in electronic communication with the controller 54, the third temperature sensor 56c is configured to send this signal to the controller 54. The controller 54 is therefore programmed to receive the signal from the third temperature sensor 56c and determine the temperature of the exhaust manifold 16, the first exhaust conduit 38, and/or the bypass conduit 46 based on the signal received from the third temperature sensor 56c.

The vehicle system 10 further includes one or more thermoelectric modules 60 coupled to one or more of the vehicle components 11. The term "thermoelectric module" means: (a) a solid-state device that converts heat flux (i.e., temperature differences) directly into electrical energy through a phenomenon called the Seebeck effect; and (b) a solid-state active heat pump which transfers heat from one side of the pump to the other, with consumption of electrical energy, depending on the direction of the current, using the Peltier effect. Each of the thermoelectric modules 60 has a heating mode, a cooling mode, and a power-generation mode. When operated in the heating mode, the thermoelectric module 60 heats the vehicle component 11 (e.g., the catalytic converter 42). When operated in the cooling mode, the thermoelectric module 60 cools the vehicle component 11 (e.g., the catalytic converter 42). When operated in the power-generation mode, the thermoelectric module 60 converts a temperature gradient of the vehicle component 11 (e.g., the catalytic converter 42) directly into electrical energy. To this end, each of the thermoelectric modules 60 is electrically connected to the onboard vehicle battery 62 of the vehicle system 10. Therefore, when operating in the power-generation mode, each of the thermoelectric modules 60 is configured to supply electrical energy to the onboard vehicle battery 62.

During operation, the controller 54 controls the operation of each of the thermoelectric modules 60. To do so, the controller 54 may be coupled to the thermoelectric modules 60 via an actuator 64. The controller 54 controls the operation of the actuator 64. The actuator 64 may be configured, for example, to switch among the operating modes (i.e., the heating mode, the cooling mode, and the power-generation mode) of the thermoelectric modules 60. As a non-limiting example, the actuator 64 may include a double-pole, double-throw (DPDT) switch to reverse the polarity of the electrical current supplied to the thermoelectric modules 60. Reversing the polarity of the electrical current will result in reversed hot and cold sides of the thermoelectric modules 60. Additionally, the actuator 64 may include current direction inverter to change the direction of the electrical current. In particular, the actuator 64 may change the current direction such that the thermoelectric module 60 operates in the power-generation mode, thereby supplying electrical energy to the onboard vehicle battery 62.

In the depicted embodiment, the vehicle system 10 includes a first thermoelectric module 60a directly coupled to the catalytic converter 42. Thus, the first thermoelectric module 60a is in direct contact with the catalytic converter 42 to facilitate heat transfer between the first thermoelectric module 60a and the catalytic converter 42. During operation, when operated in the heating mode, the first thermoelectric module 60a heats the catalytic converter 42. When operated in the cooling mode, the first thermoelectric module 60a cools the catalytic converter 42. When operated in the power-generation mode, the first thermoelectric module 60a converts a temperature gradient of the catalytic converter 42 directly into electrical energy.

The vehicle system 10 includes a second thermoelectric module 60b directly coupled to the exhaust manifold 16. Thus, the second thermoelectric module 60b is in direct contact with the exhaust manifold 16 to facilitate heat transfer between the second thermoelectric module 60b and the exhaust manifold 16. During operation, when operated in the heating mode, the second thermoelectric module 60b heats the exhaust manifold 16. When operated in the cooling mode, the second thermoelectric module 60b cools the exhaust manifold 16. When operated in the power-generation mode, the second thermoelectric module 60b converts a temperature gradient of the exhaust manifold 16 directly into electrical energy.

The vehicle system 10 includes a third thermoelectric module 60c directly coupled to the turbocharger turbine housing 34. Thus, the third thermoelectric module 60c is in direct contact with the turbocharger turbine housing 34 to facilitate heat transfer between the third thermoelectric module 60c and the turbocharger turbine housing 34. During operation, when operated in the heating mode, the third thermoelectric module 60c heats the turbocharger turbine housing 34. When operated in the cooling mode, the third thermoelectric module 60c cools the turbocharger turbine housing 34. When operated in the power-generation mode, the third thermoelectric module 60c converts a temperature gradient of the turbocharger turbine housing 34 directly into electrical energy.

The vehicle system 10 includes a fourth thermoelectric module 60d directly coupled to the bypass conduit 46, the first exhaust conduit 38, and/or the second exhaust conduit 44. Thus, the fourth thermoelectric module 60d is in direct contact with the bypass conduit 46, the first exhaust conduit 38, and/or the second exhaust conduit 44 to facilitate heat transfer. During operation, when operated in the heating mode, the fourth thermoelectric module 60d heats the bypass conduit 46, the first exhaust conduit 38, and/or the second exhaust conduit 44. When operated in the cooling mode, the fourth thermoelectric module 60d cools the bypass conduit 46, the first exhaust conduit 38, and/or the second exhaust conduit 44. When operated in the power-generation mode, the fourth thermoelectric module 60d converts a temperature gradient of the bypass conduit 46, the first exhaust conduit 38, and/or the second exhaust conduit 44 directly into electrical energy.

Figure 2:
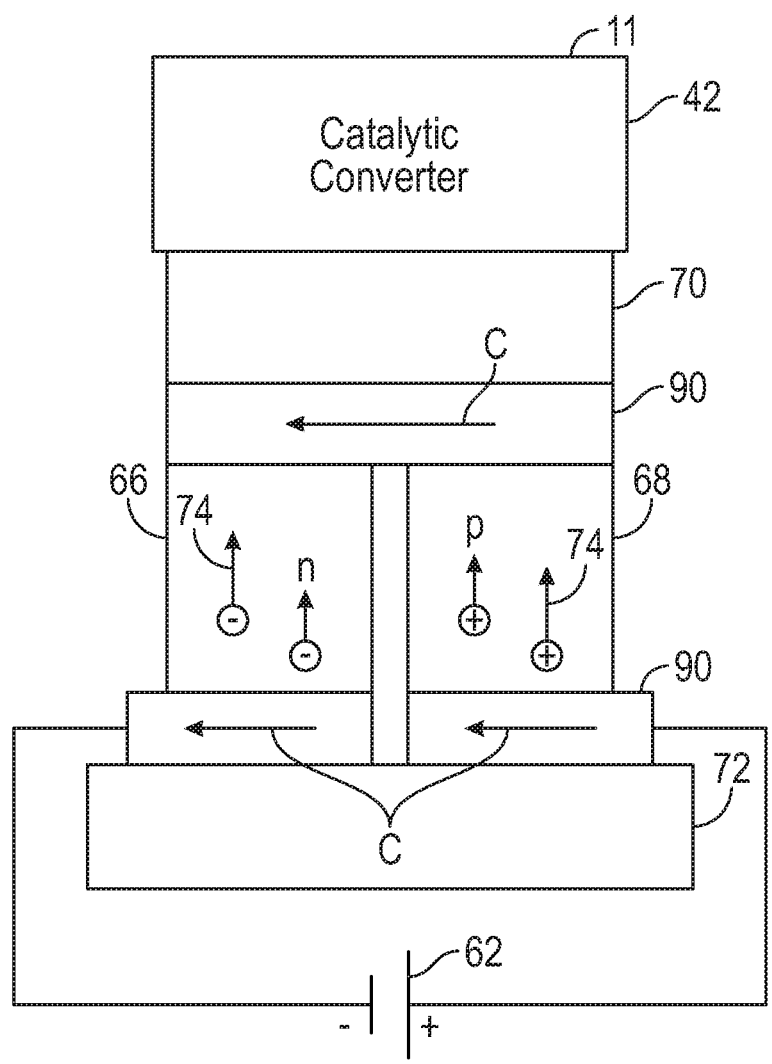
FIG. 2 is a schematic illustration of the thermoelectric module schematically illustrated in FIG. 1.

With reference to FIG. 2, the thermoelectric modules 60 employ the Peltier effect to create a heat flux 74 between the junction of two different types of materials. Thus, thermoelectric modules 60 are configured to transfer heat by applying a DC voltage to the sides of a semiconductor to create a temperature differential. In the depicted embodiment, each of the thermoelectric modules 60 is a solid-state heat pump that can transfer heat from one side of the thermoelectric modules 60 to the other, with consumption of electrical energy, depending on the direction of the current. The operation of the thermoelectric modules 60 may thus be changed between cooling and heating by changing the direction of the electric current. In summary, the thermoelectric modules 60 transfers heat upon receipt of electrical energy.

The thermoelectric modules 60 may include a plurality of n-type semiconductor elements 66 and p-type semiconductor elements 68 electrically connected in series but thermally connected in parallel. The n-type semiconductor elements 66 may be configured as pellets and may be wholly or partly made of n-type $Bi_2Te_3$, n-type PbTe, n-type $CoSb_3$, n-type SiGe or another suitable material. The p-type semiconductor elements 68 may be configured as pellets and may be wholly or partly made of p-type $Sb_2Te_3$, a p-type PbTe, p-type $CeFe_4Sb_{12}$, p-type SiGe, TAGS, $Yb_{14}MnSb_{11}$, or another suitable material.

The thermoelectric modules 60 includes a first substrate 70 and a second substrate 72 both made of a material that is an electrical insulator but a good heat conduct. For example, the first substrate 70 and second substrate 72 may be wholly or partly made of ceramic. The n-type semiconductor elements 66 and p-type semiconductor elements 68 are disposed between the first substrate 70 and second substrate 72. The first substrate 70 may be directly connected or mounted on one or more vehicle components 11 (e.g., the catalytic converter 42). A plurality of electrical carriers 90 are mechanically coupled between the second substrate 72 and the n-type semiconductor elements 66 and p-type semiconductor elements 68. These electrical carriers 90 are electrically connected to the onboard vehicle battery 62. Another set of electrical carriers 90 is mechanically coupled between the first substrate 70 and the n-type semiconductor elements 66 and p-type semiconductor elements 68. All the electrical carriers 90 are wholly or partly made of an electrically conductive material, such as a metal, and may be configured as electrically conductive tabs.

When DC voltage is applied to the thermoelectric module 60 with a direction from the p-type semiconductor elements 66 to the n-type semiconductor elements 68, heat flux is created along with the movement of each p-type and n-type carrier (see heat flux 74), thereby producing a thermal gradient along each semiconductor. This thermal gradient creates hot end at the substrate 70 and cold end at the second substrate 72 at the thermoelectric module 60. The first substrate 70 thus becomes hot, and the second substrate 72 become cold. Because the first substrate 70 is thermally coupled to the vehicle component 11 (e.g., the catalytic converter 42), the vehicle component 11 becomes hot when the first substrate 70 becomes hot. Reversing the polarity of the electrical current C, from the n-type semiconductor elements 66 to the p-type semiconductor elements 68, will result in reversed hot and cold sides. Thus, the vehicle component 11 can become cold when the first substrate 70 becomes cold. As discussed above, the thermoelectric module 60 may additionally supply electrical energy to the onboard vehicle battery 62 by harvesting exhaust waste heat from the vehicle component 11.

Figure 3:
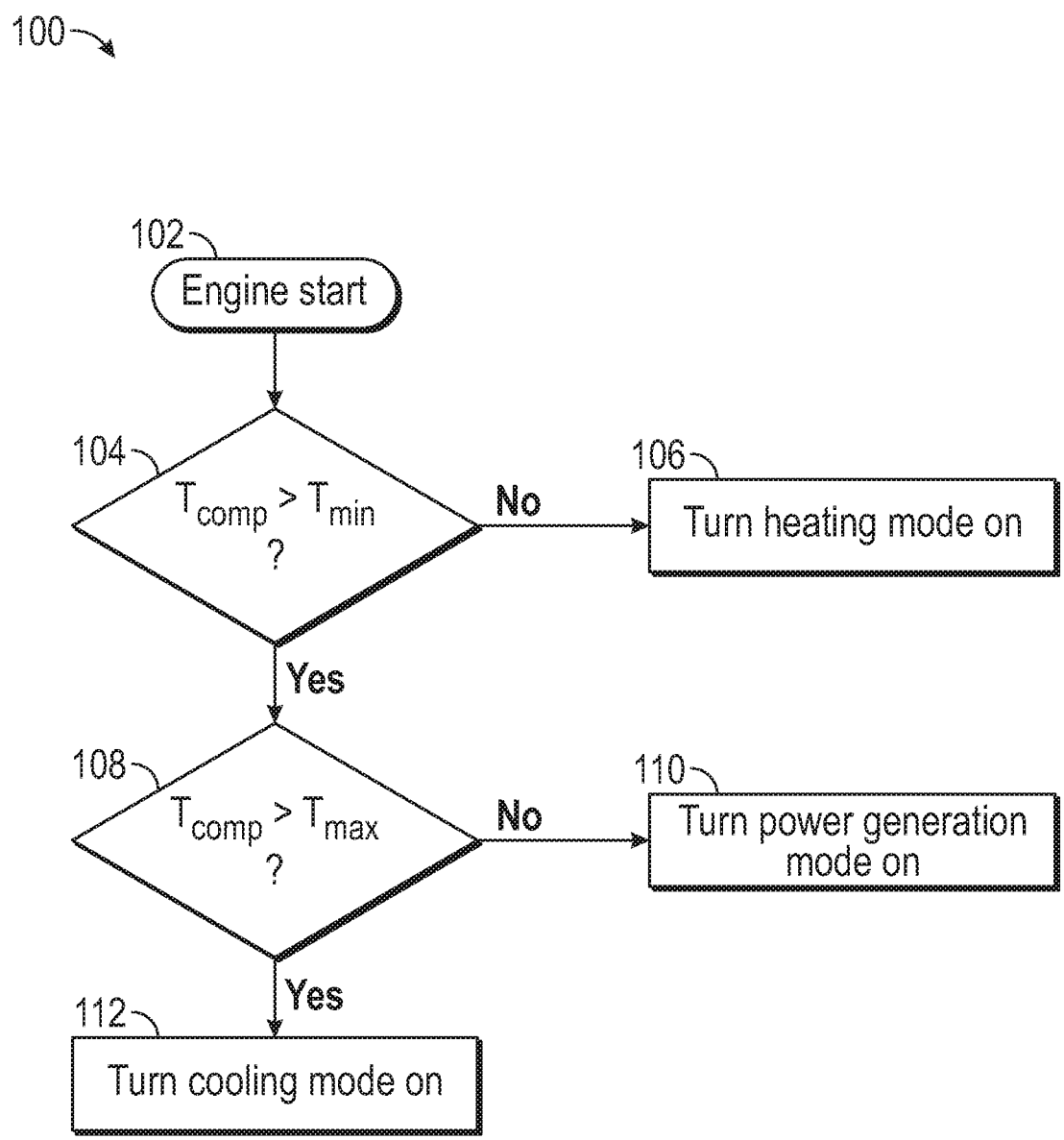
FIG. 3 is a flowchart of a method of controlling the thermoelectric module of FIG. 2.

FIG. 3 is a flowchart of a method 100 for operating the vehicle system 10 using the thermoelectric modules 60. By executing the method 100, the vehicle emissions are minimized by enhancing catalyst light-off and reducing cold start soot creation. Further, by utilizing the method 100, the electric power generation is possible using waste heat from the after-treatment system 40. Also, by utilizing the method 100, the fuel economy of the vehicle system 10 is enhanced by reducing the need for enrichment. The method 100 may be executed by the controller 54 and begins at block 102. At block 102, the internal combustion engine 12 starts. Block 102 may represent a cold engine start. Then, the method 100 proceeds to block 104. At block 104, the controller 54 determines the temperature $T_{comp}$ of the vehicle component 11 (e.g., the catalytic converter 42) based on the signal received from the temperature sensor 56 (e.g., the first temperature sensor 56a). In addition, at block 104, the controller 54 determines whether the temperature $T_{comp}$ of the vehicle component 11 (e.g., the catalytic converter 42) is greater than a predetermined minimum temperature $T_{min}$ (e.g., the light-off temperature of the catalytic converter 42). Each vehicle component 11 has a distinct predetermined minimum temperature $T_{min}$, which is stored on the memory 58 of the controller 54. It is desirable to maintain the temperature $T_{comp}$ of the vehicle component 11 above the predetermined minimum temperature $T_{min}$ to efficiently operate the vehicle components 11. The predetermined minimum temperatures $T_{min}$ are obtained by testing the vehicle components 11. The predetermined minimum temperature $T_{min}$ for the catalytic converter 42 is the light-off temperature of the catalytic converter 42. The term "light-off temperature" means the temperature at which catalytic reactions are initiated within a catalytic converter. If the temperature $T_{comp}$ of the vehicle component 11 (e.g., the temperature of the catalytic converter 42) is less than the predetermined minimum temperature $T_{min}$ (e.g., the light-off temperature of the catalytic converter 42), then the method 100 proceeds to block 106.

At block 106, the controller 54 commands the thermoelectric module 60 to operate in its heating mode to heat the vehicle component 11 (e.g., the catalytic converter 42) until the temperature $T_{comp}$ of the vehicle component 11 (e.g., the temperature of the catalytic converter 42) reaches the predetermined minimum temperature $T_{min}$ (e.g., the light-off temperature of the catalytic converter 42). If the temperature $T_{comp}$ of the vehicle component 11 (e.g., the temperature of the catalytic converter 42) is greater than the predetermined minimum temperature $T_{min}$ (e.g., the light-off temperature of the catalytic converter 42), then the method 100 proceeds to block 108. At block 108, the controller 54 determines whether the temperature $T_{comp}$ of the vehicle component 11 (e.g., the catalytic converter 42) is greater than a predetermined maximum temperature $T_{max}$. Each vehicle component 11 has a distinct predetermined maximum temperature $T_{max}$, which is stored on the memory 58 of the controller 54. It is desirable to maintain the temperature $T_{comp}$ of the vehicle component 11 below the predetermined maximum temperature $T_{max}$ to protect the vehicle components 11. The predetermined maximum temperatures $T_{max}$ are obtained by testing the vehicle components 11. If the temperature $T_{comp}$ of the vehicle component 11 (e.g., the temperature of the catalytic converter 42) is less than the predetermined maximum temperature $T_{max}$, then the method 100 proceeds to block 110.

At block 110, the controller 54 commands the thermoelectric module 60 to operate in the power-generation mode. In the power-generation mode, the thermoelectric module 60 converts the temperature gradient of the vehicle component 11 directly into electrical energy. Further, in the power-generation mode, the thermoelectric module 60 supplies electrical energy to the onboard vehicle battery 62. In other words, in the power-generation mode, thermoelectric module 60 supplies electrical energy to the onboard vehicle battery 62 by harvesting exhaust waste heat from the vehicle component 11. If the temperature $T_{comp}$ of the vehicle component 11 (e.g., the temperature of the catalytic converter 42) is greater than the predetermined maximum temperature $T_{max}$, then the method 100 proceeds to block 112.

At block 112, the controller 54 commands the thermoelectric module 60 to operate in its cooling mode to cool the vehicle component 11 (e.g., the catalytic converter 42) until the temperature $T_{comp}$ of the vehicle component 11 (e.g., the temperature of the catalytic converter 42) is below the predetermined maximum temperature $T_{max}$ in order to protect the vehicle component 11.

While the best modes for carrying out the disclosure have been described in detail, those familiar with the art to which this disclosure relates will recognize various alternative designs and embodiments for practicing the disclosure within the scope of the appended claims.

What is claimed is:

1. A vehicle system, comprising:
a turbocharger including a turbocharger turbine housing;
a thermoelectric module coupled to the turbocharger turbine housing to allow heat transfer between the turbocharger turbine housing and the thermoelectric module, wherein the thermoelectric module has:
a heating mode in which the thermoelectric module heats the turbocharger turbine housing;
a cooling mode in which the thermoelectric module cools the turbocharger turbine housing;
a power-generation mode in which the thermoelectric module converts a temperature gradient of the turbocharger turbine housing directly into electrical energy;
a temperature sensor coupled to the turbocharger turbine housing, wherein the temperature sensor is configured to measure a temperature of the turbocharger turbine housing, and the temperature sensor is configured to generate a signal indicative of the temperature of the turbocharger turbine housing;
a controller in electronic communication with the thermoelectric module, wherein the controller is programmed to:
determine the temperature of the turbocharger turbine housing based on the signal received from the temperature sensor; and
switch the thermoelectric module among the heating mode, the cooling mode, and the power-generation mode based on the temperature of the turbocharger turbine housing.

2. The vehicle of claim 1, wherein the controller is programmed to:
determine that the temperature of the turbocharger turbine housing is less than a predetermined minimum temperature of the turbocharger turbine housing; and
in response to determining that the temperature of the turbocharger turbine housing is less than the predetermined minimum temperature of the turbocharger turbine housing, switch the thermoelectric module to operate in the heating mode to heat the turbocharger turbine housing.

3. The vehicle system of claim 2, wherein the controller is programmed to:
in response to determining that the temperature of the turbocharger turbine housing is less than a predetermined maximum temperature, switch the thermoelectric module to operate in the power-generation mode to generate the electrical energy directly from a temperature gradient of the turbocharger turbine housing.

4. The vehicle system of claim 3, wherein the controller is programmed to switch the thermoelectric module to operate in the power-generation mode to generate the electrical energy directly from the temperature gradient of the turbocharger turbine housing in response to determining that the temperature of the turbocharger turbine housing is less than the predetermined maximum temperature and determining that the temperature of the turbocharger turbine housing is greater than the predetermined minimum temperature of the turbocharger turbine housing.

5. The vehicle system of claim 4, wherein the controller is programmed to:
in response to determining that the temperature of the turbocharger turbine housing is greater than the predetermined maximum temperature, switch the thermoelectric module to operate in the cooling mode to cool the turbocharger turbine housing.

6. The vehicle system of claim 5, wherein the controller is programmed to:
switch the thermoelectric module to operate in the cooling mode to cool the turbocharger turbine housing in response to determining that the temperature of the turbocharger turbine housing is greater than the predetermined maximum temperature and determining that the temperature of the turbocharger turbine housing is greater than the predetermined minimum temperature of the catalytic converter turbocharger turbine housing.

7. The vehicle system of claim 1, wherein the thermoelectric module is in direct contact with the turbocharger turbine housing, and the thermoelectric module is electrically coupled to a battery.

8. The vehicle system of claim 1, wherein the thermoelectric module is in direct contact with the turbocharger turbine housing, the thermoelectrical module is electrically coupled to a battery, and the controller is programmed to:
switch the thermoelectric module to operate in the power-generation mode to generate the electrical energy directly from a temperature gradient of the turbocharger turbine housing in response to determining that the temperature of the turbocharger turbine housing is less than a predetermined maximum temperature and greater than a predetermined minimum temperature of the turbocharger turbine housing, and the electrical energy generated by the thermoelectric module is supplied to the battery; and
switch the thermoelectric module to operate in the cooling mode to cool the turbocharger turbine housing in response to determining that the temperature of the turbocharger turbine housing is greater than the predetermined maximum temperature and determining that the temperature of the turbocharger turbine housing is greater than the predetermined minimum temperature of the turbocharger turbine housing.

9. A method, comprising:
determining a temperature of a turbocharger turbine housing of a turbocharger using a temperature sensor that is coupled to the turbocharger turbine housing;
heating the turbocharger turbine housing using a thermoelectric module in response to determining that the temperature of the turbocharger turbine housing is less than a predetermined minimum temperature of the turbocharger turbine housing;
wherein the turbocharger turbine housing, the temperature sensor, and the thermoelectric module are part of a vehicle system;
wherein the thermoelectric module is coupled to the turbocharger turbine housing to allow heat transfer between the turbocharger turbine housing and the thermoelectric module;
wherein the thermoelectric module has:
a heating mode in which the thermoelectric module heats the turbocharger turbine housing;
a cooling mode in which the thermoelectric module cools the turbocharger turbine housing;
a power-generation mode in which the thermoelectric module converts a temperature gradient of the turbocharger turbine housing directly into electrical energy;
wherein the temperature sensor is configured to measure the temperature of the turbocharger turbine housing;
wherein the temperature sensor is configured to generate a signal indicative of the temperature of the turbocharger turbine housing;
wherein the vehicle system further includes a controller in electronic communication with the thermoelectric module;
wherein the controller is programmed to:
determine the temperature of the turbocharger turbine housing based on the signal received from the temperature sensor; and
switch the thermoelectric module among the heating mode, the cooling mode, and the power-generation mode based on the temperature of the turbocharger turbine housing.

10. The method of claim 9, further comprising supplying electrical energy to a battery using the thermoelectric module in response to determining that the temperature of the turbocharger turbine housing is less than a predetermined maximum temperature.

11. The method of claim 10, wherein supplying the electrical energy to the battery using the thermoelectric module occurs in response to determining that the temperature of the turbocharger turbine housing is less than the predetermined maximum temperature and determining that the temperature of the turbocharger turbine housing is greater than the predetermined minimum temperature of the turbocharger turbine housing.

12. The method of claim 11, further comprising cooling the turbocharger turbine housing using the thermoelectric module in response to determining that the temperature of the turbocharger turbine housing is greater than the predetermined maximum temperature.

13. The method of claim 12, wherein cooling the turbocharger turbine housing using the thermoelectric module occurs in response to determining that the temperature of the turbocharger turbine housing is greater than the predetermined maximum temperature and determining that the temperature of the turbocharger turbine housing is greater than the predetermined minimum temperature of the turbocharger turbine housing.

14. A vehicle system, comprising:
a vehicle component, wherein the vehicle component includes a turbocharger turbine housing, and the turbocharger turbine housing is part of a turbocharger;
a battery;
a thermoelectric module coupled to the vehicle component to allow heat transfer between the vehicle component and the thermoelectric module, wherein the thermoelectric module is electrically connected to the battery, and the thermoelectric module has:
a heating mode in which the thermoelectric module heats the vehicle component;

a cooling mode in which the thermoelectric module cools the vehicle component;

a power-generation mode in which the thermoelectric module converts a temperature gradient of the vehicle component directly into electrical energy and supplies the electrical energy to the battery;

a temperature sensor coupled to the vehicle component, wherein the temperature sensor is configured to measure a temperature of the vehicle component, and the temperature sensor is coupled to the turbocharger turbine housing; and a controller in electronic communication with the thermoelectric module, wherein the controller is programmed to switch the thermoelectric module among the heating mode, the cooling mode, and the power-generation mode based on the temperature of the vehicle component.

15. The vehicle system of claim 14, wherein, the temperature sensor is directly coupled to the turbocharger turbine housing, the vehicle system further includes the turbocharger, the turbocharger includes a compressor and a turbine coupled to each other, the turbocharger includes the turbocharger turbine housing, the turbocharger turbine housing houses the turbine, the thermoelectric module is directly coupled to the turbocharger turbine housing, the temperature sensor is in electronic communication with the controller, the temperature sensor is configured to measure a temperature of the turbocharger turbine housing, the temperature sensor is configured to generate a signal indicative of the temperature of the turbocharger turbine housing, the controller is configured to determine the temperature of the turbocharger turbine housing based on the signal received from the temperature sensor, the vehicle system further includes a battery electrically coupled to the thermoelectric module, the controller is programmed to switch the thermoelectric module to operate in the heating mode to heat the turbocharger turbine housing in response to determining that the temperature of the turbocharger turbine housing is less than a predetermined minimum temperature, the controller is programmed to switch the thermoelectric module to operate in the power-generation mode to generate the electrical energy directly from a temperature gradient of the turbocharger turbine housing in response to determining that the temperature of the turbocharger turbine housing is less than a predetermined maximum temperature and determining that the temperature of the turbocharger turbine housing is greater than the predetermined minimum temperature, the electrical energy generated by the thermoelectric module is supplied to the battery, the controller is programmed to switch the thermoelectric module to operate in the cooling mode to cool the turbocharger turbine housing in response to determining that the temperature of the turbocharger turbine housing is greater than the predetermined maximum temperature and determining that the temperature of the turbocharger turbine housing is greater than the predetermined minimum temperature.

\* \* \* \* \*